US005096339A

United States Patent [19]

Shoji

[11] Patent Number: 5,096,339

[45] Date of Patent: Mar. 17, 1992

[54] ELECTROMAGNETIC BASE DRILL WITH ANTIFLOATING CONTROL MEANS

[75] Inventor: Michihiro Shoji, Tokyo, Japan

[73] Assignee: Nitto Kohki Co., Ltd., Tokyo, Japan

[21] Appl. No.: 644,573

[22] Filed: Jan. 23, 1991

[30] Foreign Application Priority Data

Jan. 26, 1990 [JP] Japan ................................ 2-6333[U]

[51] Int. Cl.$^5$ .............................................. B23B 47/24

[52] U.S. Cl. ........................................... 408/6; 408/76

[58] Field of Search ........................ 408/6, 9, 11, 76, 4, 408/5, 8, 10

[56] References Cited

U.S. PATENT DOCUMENTS 4,278,371 7/1981 Meyer .................................. 408/76

4,604,006 8/1986 Shoji et al. ........................ 408/11 X

FOREIGN PATENT DOCUMENTS 3306063 9/1983 Fed. Rep. of Germany ........ 408/76

63-139605 6/1988 Japan .

2173428A 4/1986 United Kingdom .

*Primary Examiner*—Steven C. Bishop

*Attorney, Agent, or Firm*—Nixon & Vanderhye

[57] ABSTRACT

A drill apparatus with an electromagnet base, which has an electric drill directed downwards, is provided with an electromagnet base having an electromagnet for attaching the apparatus to a to-be-worked object by magnetic force. The electric drill is rotated by a drill motor and moved by a feed motor towards the object. A Hall element is situated on the electromagnet base. Two comparators detects whether or not a Hall voltage output from the Hall element falls in a predetermined range of voltage values. When the Hall voltage does not fall in this range, a transistor is turned on. Consequently, a relay is operated, a contact is opened, and power supply to the drill motor and the feed motor is stopped.

14 Claims, 6 Drawing Sheets

ELECTROMAGNETIC BASE DRILL WITH ANTIFLOATING CONTROL MEANS

BACKGROUND OF THE INVENTION

1. Field of the Invention

The present invention relates to a drill apparatus with an electromagnet base, wherein the electromagnet base is attached to a workpiece or a to-be-worked object by magnetic force, and an electric drill directed downwards is advanced into the object to drill the object. In particular, this invention relates to a drill apparatus with an electromagnet base, wherein when the electromagnet base floats above the object because of some reasons, the rotation and advancement of the drill motor is stopped immediately.

2. Description of the Related Art

There is well known a drill apparatus with an electromagnet base, comprising a drill apparatus having an electric drill with a drill or an annular cutter which can be moved vertically, an electromagnet base for bringing the drill apparatus into magnetic contact with a to-be-worked object, and a motor for automatically moving the electric drill towards the object. This type of drill apparatus is disclosed, for example, in Published Unexamined Japanese Patent Application No. 63-139605.

In this drill apparatus with an electromagnet base, when cut chips or swarf of the object are caught in the drill or annular cutter mounted on the electric drill, the electromagnet base may be lifted from the object.

To solve this problem, there is employed a conventional drill apparatus with an electromagnet base wherein, for example, a finger or a microswitch is provided under the electromagnet base and, when the electromagnet base is lifted, the drill motor is stopped by the operation of the finger or switch.

The conventional apparatus has the following problems.

A finger or a microswitch requires a certain stroke to effect ON/OFF operation of the contact. Thus, in some cases, a fine lift of the electromagnet base cannot be detected.

In addition, a microswitch having a mechanical contact is liable to be damaged.

SUMMARY OF THE INVENTION

The present invention has been made in consideration of the above problems and its object is to provide a drill apparatus with an electromagnet base, having a high durability, wherein even when the electromagnet base is slightly lifted, the lift can surely be detected, and the rotation of a drill motor and also a feed motor (if provided) can be stopped.

According to the present invention, there is provided a drill apparatus provided with an electromagnet base having an electromagnet for attaching the drill to a to-be-worked object (or workpiece) by magnetic force with an electric drill element directed downwards, said apparatus comprising: a drill motor for rotating said electric drill; a Hall element situated on the electromagnet base; comparing means for comparing a Hall voltage output from the Hall element with a predetermined voltage; and a safety circuit for stopping power supply to the drill motor in accordance with an output from the comparing means.

According to this apparatus, the Hall element is situated on the electromagnet base. A Hall voltage output from the Hall element is compared with a predetermined voltage. In accordance with the comparison result, electric power supply to the drill motor and feed motor is stopped.

In the state wherein the electromagnet base is attached to the object, the magnetic flux generated by the electromagnet passes through the base and the object. Thus, in accordance with the position of the Hall element, the Hall element passes or does not pass magnetic flux.

Suppose that the electromagnet base is attached to the object and the Hall element is constructed so as to pass magnetic flux. In this case, when the electromagnet base is lifted from the object, a gap is produced between the electromagnet base and the object and the passing of magnetic flux is disturbed. Thus, the amount of magnetic flux passing through the Hall element decreases.

Inversely, suppose that the electromagnet base is attached to the object and the Hall element is constructed so as not to pass magnetic flux. In this case, when the electromagnet base is lifted from the object, the amount of magnetic flux passing through the Hall element increases.

If the magnetic flux passing through the Hall element varies, the output voltage or Hall voltage of the Hall element varies accordingly. In accordance with the magnitude of the Hall voltage, power supply to the drill motor and feed motor is stopped.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The present invention will now be described with reference to the accompanying drawings.

Figure 1:
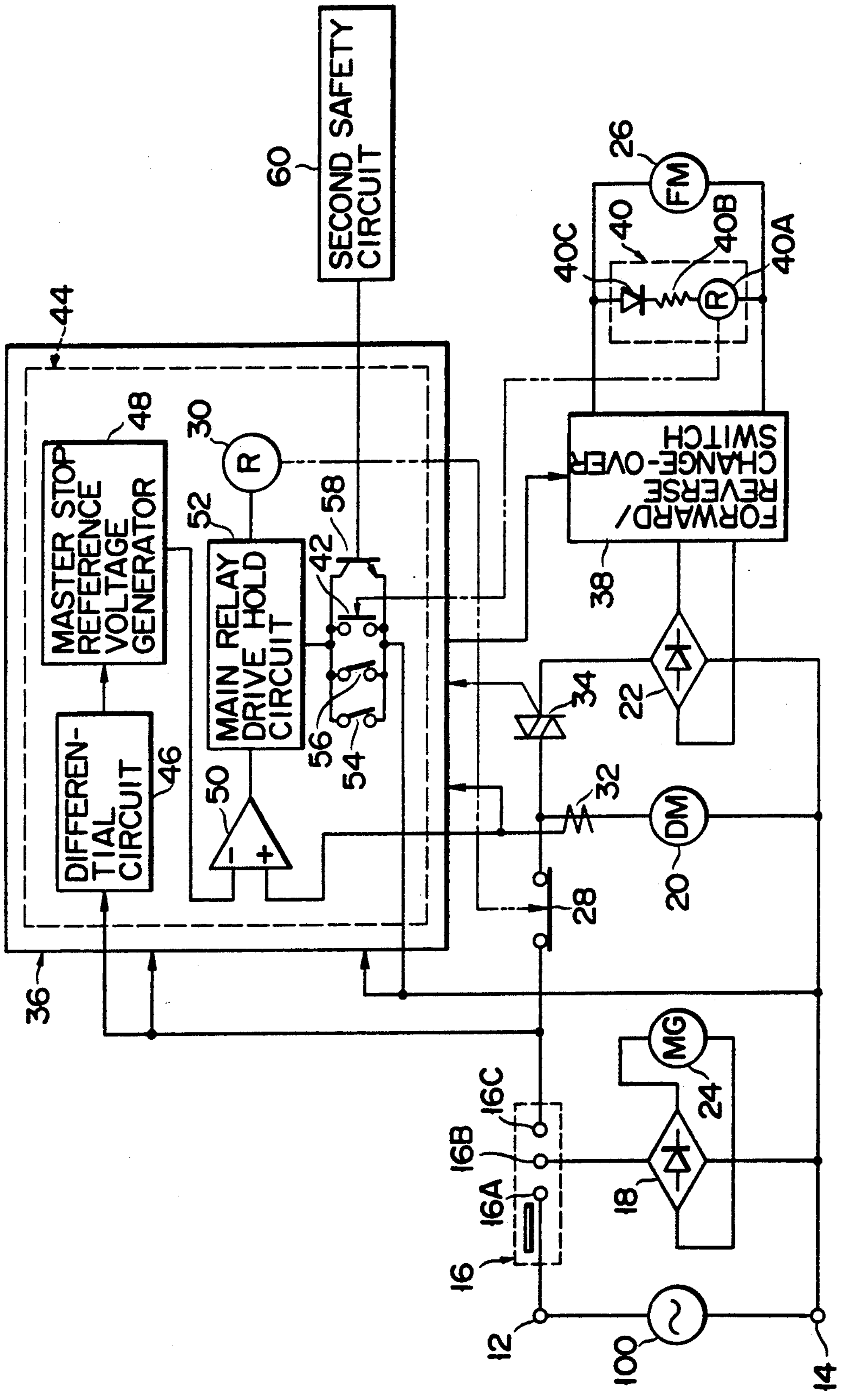
FIG. 1 is a block diagram showing the structure of a drill apparatus with an electromagnet base according to a first embodiment of the present invention.

FIG. 1 is a block diagram showing a first embodiment of the invention.

Referring to FIG. 1, input terminals 12 and 14 of a drill apparatus 10 with an electromagnet base are connected to a commercial AC power source 100. A main switch 16, in its first stage operation, connects a pair of input terminals of a bridge-type rectifier 18 to the power source 100, and, in its second stage operation, connects a drill motor (DM) 20 and a bridge-type rectifier 22 to the power source 100. Specifically, the main switch 16 comprises terminals 16A, 16B and 16C. In the first stage operation, the terminals 16A and 16B contact each other and, in the second stage operation, the terminals 16A, 16B and 16C contact one another.

An electromagnet (MG) 24 is connected to a pair of output terminals of the bridge-type rectifier 18.

In this embodiment, the drill motor 20 is an AC motor and a feed motor (FM) 26 (described later) is a DC motor. A normally closed contact 28 is opened by an operation of a relay (R) 30 (described later). A load detector 32 detects an electric current flowing to the drill motor 20, and includes a CT transformer, etc. A triac 34 is controlled by a feed motor control circuit 36 (described later). The voltage generated by the load detector 32 increases as the current flowing through the drill motor 20 increases.

A pair of output terminals of the bridge-type rectifier 22 is connected to a feed motor 26 through a forward-/reverse change-over switch 38. A feed motor control circuit 36 controls the switch 38, for example, in accordance with the load applied to the drill motor 20, thereby switching the polarity of the output voltage of bridge-type rectifier 22 supplied to the feed motor 26. Specifically, for example, when the load on the drill motor 20 decreases and the drilling operation is considered to be finished, the forward/reverse change-over switch 38 is operated to rotate the feed motor 26 reversely and elevate the drill (not shown).

A first safety circuit 40 is connected to the paired output terminals of the rectifier 22 through the forward-/reverse change-over switch 38, in parallel to the feed motor 26. As is shown in FIG. 1, the first safety circuit 40 is constituted by connecting a relay (R) 40A, a resistor 40B and a diode 40C in series.

When current is supplied to the feed motor 26 so as to lower the electric drill, the diode 40C allows current to flow to the relay 40A. The resistance value of the resistor 40B is set so as to operate the relay 40A when a current exceeding a predetermined value flows to the feed motor 26.

The relay 40A has a normally opened contact 42 (described later) and operates to close the contact 42.

By the second stage operation of the main switch 16, the drill motor 20 and the feed motor control circuit 36 are activated. After activated, the control circuit 36 controls the triac 34 in accordance with the output from the load detector 32. Specifically, when the output from the load detector 32 is high (i.e. when the load on the drill motor 20 is high), the feed motor control circuit 36 increases the firing angle of current to the input of the bridge-type rectifier 22, thus decreasing the current to this input. Inversely, when the output from the load detector 32 is low (i.e. when the load on the drill motor 20 is low), the feed motor control circuit 36 decreases the firing angle of current to the input of the bridge-type rectifier 22, thus increasing the current to this input.

The feed motor control circuit 36 has a master stop circuit 44.

A differential circuit 46 of the master stop circuit 44 differentiates the output current of the AC power source 100, which is supplied upon the second stage operation of the main switch 16. At the time of the second stage operation of the main switch 16, an output differential signal from the differential circuit 46 increases owing to the rising of current flowing to the drill motor 20 and bridge-type rectifier 22. Once the output differential signal has increased, this signal begins to decrease.

The master stop reference voltage generator 48 outputs a predetermined voltage (master stop reference voltage) to an inversion input terminal of a comparator 50. When the output differential signal from the differential circuit 46 is a predetermined value or more, the master stop reference voltage generator 48 increases the master stop reference voltage, and when the output differential signal is lower than the predetermined value, it restores the master stop reference voltage to the initial value.

A non-inversion input terminal of the comparator 50 is supplied with an output signal from the load detector 32.

An output terminal of the comparator 50 is connected to a main relay drive hold circuit 52. The circuit 52 is operated by an "H" output of the comparator 50, thereby driving the relay 30.

The value of the master stop reference voltage generated by the master stop reference voltage generator 48 corresponds substantially to a maximum value of electric current to be supplied to the drill motor 20 in the normal mode. When the current actually flowing to the drill motor 20 exceeds the maximum value, the output of the comparator 50 becomes "H" and operates the relay 30, thus opening the contact 28. Consequently, even when the main switch 16 is operated in the second stage, the rotation of the drill motor 20 and the feed motor 26 is stopped (master-stopped).

At the beginning of power supply to the drill motor 20, that is, at the time of the second stage operation of the main switch 16, electric current suddenly begins to flow to the drill motor 20. Thus, the output of the load detector 32 may instantaneously exceed the value of the master stop reference voltage. However, at the time of the second stage operation of the main switch 16, the output differential signal of the differential circuit 46 raises the voltage value of the master stop reference voltage generated by the master stop reference voltage generator 48. In this case, the output of the comparator 50 remains at the "L" level. When the current value of the drill motor 20 lowers to the normal value, the output differential signal of the differential circuit 46 is decreased accordingly and the master stop reference voltage is restored to the initial value.

The main relay drive hold circuit 52 is connected, as shown in FIG. 1, to an upper end detection switch 54, a displacement detection switch 56 and the normally opened contact 42 of the relay 40A of first safety circuit 40. The main relay drive hold circuit 52 is operated when these switches or contact is closed, thereby driving the relay 30.

Once the main relay drive hold circuit 52 is operated, the operation thereof is kept until the second stage operation of the main switch 16 is released, even if the switch 54 or 56 or contact 42 is opened or the output of the comparator 50 becomes at the "L" level.

The feed motor control circuit 36 and master stop circuit 44 are also disclosed in U.S. patent application Ser. No. 540,197 (1990/6/19) filed by the inventor of the present application.

The main relay drive hold circuit 52 is also connected to a transistor 58. The base of the transistor 58 is connected to, and driven by, a second safety circuit 60. The transistor 58 is turned on to drive the main relay drive hold circuit 52 and the relay 30.

Figure 2:
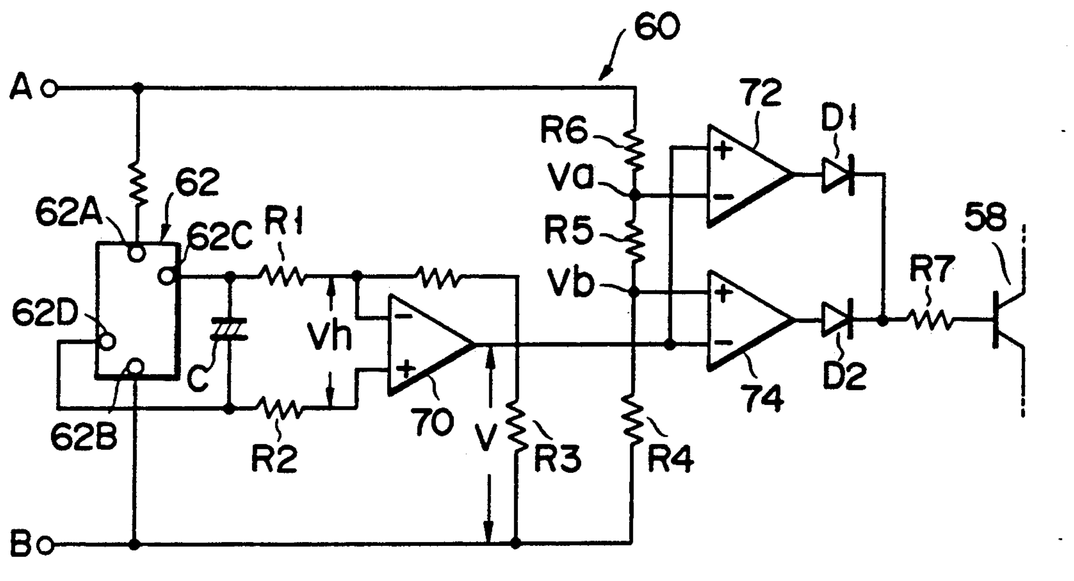
FIG. 2 shows in detail an example of a second safety circuit shown in FIG. 1.

FIG. 2 shows in detail the circuit configuration of the second safety circuit 60.

Power terminals A and B of the second safety circuit 60 are connected to the commercial AC power source 100 (FIG. 1) through a transformer, a constant current circuit, etc. (these are not shown) upon the second stage operation of the main switch 16 (FIG. 1).

The terminal B acts as a ground terminal.

A Hall element 62 has a pair of power source terminals 62A and 62B and a pair of output terminals 62C and 62D The power source terminals 62A and 62B of the Hall element 62 are connected to the power terminals A and B.

Figure 3:
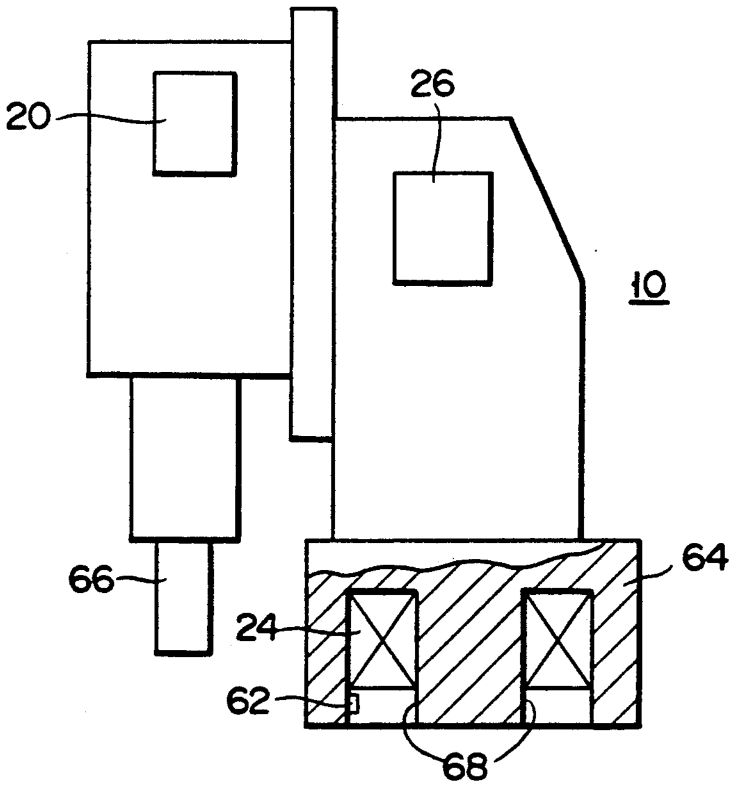
FIG. 3 is a side view of the apparatus of the first embodiment.

FIG. 3 is a side view of the apparatus according to the first embodiment of the invention. An electromagnet base 64 is shown in cross section. In FIG. 3, the reference numerals, which are shown in FIGS. 1 and 2, denote like structural elements. A drill or an annular cutter (not shown) is mounted on an arbor 66, and an electromagnet 24 is mounted within a recess 68 in the electromagnet base 64.

A Hall element 62 is attached to that side wall of the recess 68, which is closest to the arbor 66.

Referring back to FIG. 2, the output terminals 62C and 62D of the Hall element 62 are connected to a capacitor C, and also to first ends of the resistors R1 and R2. The second ends of the resistors R1 and R2 are connected to an inversion input terminal and a non-inversion input terminal of an operational amplifier 70.

The Hall element 62 outputs a voltage proportional to the magnetic flux passing through the Hall element 62. Specifically, a Hall voltage Vh generated between the inversion input terminal and the non-inversion input terminal of the operational amplifier 70 varies in relation to the magnetic flux passing through the Hall element 62, as shown in FIG. 4.

An output terminal of the operational amplifier 70 is connected to the terminal B (ground side) through a resistor R3 and also connected to a non-inversion input terminal of a comparator 72 and an inversion input terminal of a comparator 74.

Figure 4:
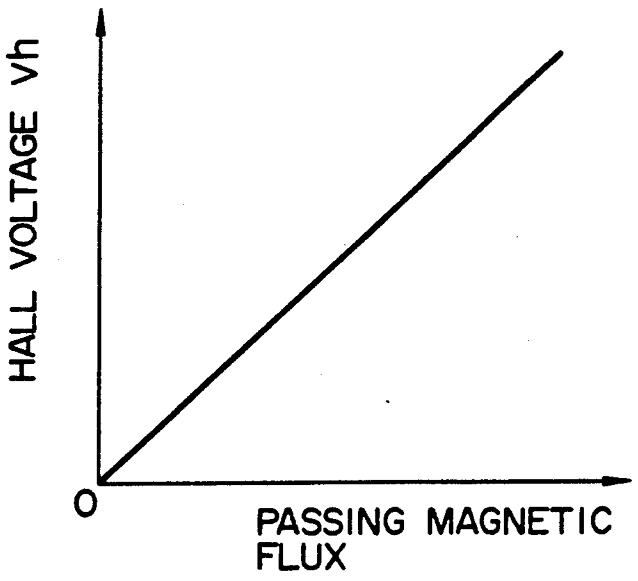
FIG. 4 is a graph showing the relationship between a hole voltage Vh and a magnetic flux passing through a hole element.
Figure 5:
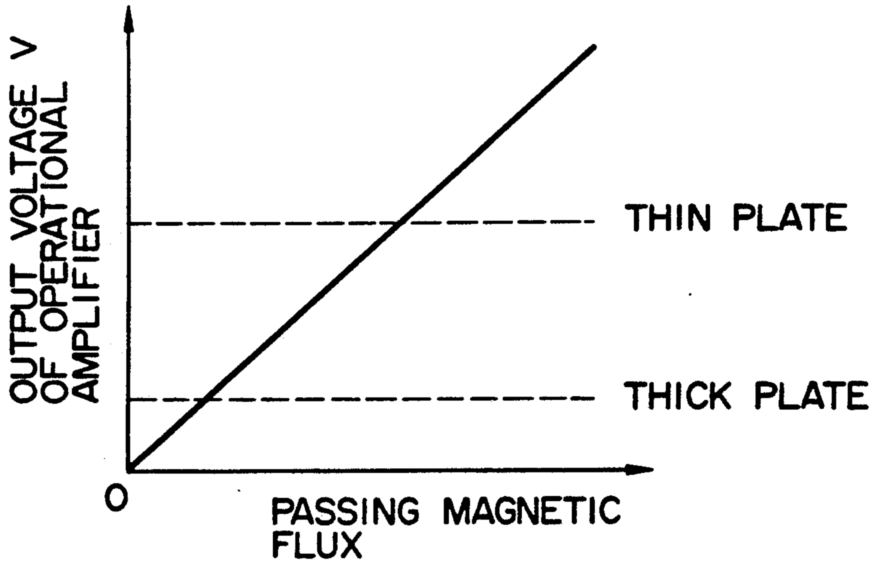
FIG. 5 is a graph showing the relationship between an output voltage V of an operational amplifier, shown in FIG. 2, and a magnetic flux passing through a hole element.

An output voltage V of the operational amplifier 70 and a magnetic flux passing through the Hall element 62 have the relationship, as shown in FIG. 5, which is similar to the relationship of FIG. 4.

Resistors R4, R5 and R6 are connected in series between the terminals A and B. A connection node Va between the resistors R6 and R5 is connected to an inversion input terminal of the comparator 72, and a connection node Vb between the resistors R5 and R4 is connected to a non-inversion input terminal of the comparator 74.

Output terminals of the comparators 72 and 74 connected to a first end of a resistor R7 through diodes D1 and D2. The second end of the resistor R7 is connected to the base of the aforementioned transistor 58 (see FIG. 1).

Figure 6:
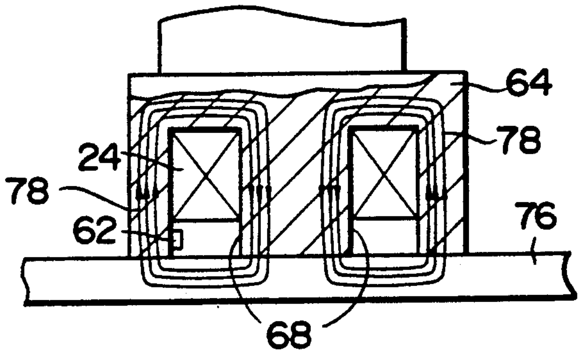
FIG. 6 shows the state of magnetic flux when the entire lower surface of the electromagnet base is brought into magnetic contact with an object.

FIG. 6 shows the state of the magnetic flux in the case where the drill apparatus 10 with electromagnetic base is brought into magnetic contact with the object 76. In FIG. 6, the structural parts of the drill apparatus 10, excluding the electromagnet 64, are omitted and not shown.

As shown in FIG. 6, magnetic flux 78 generated around the electromagnet 24 passes through the electromagnet base 64 and object 76, and does not substantially pass through the Hall element 62 attached to the recess 68 of electromagnet base 64. The resistance values of the resistors R3 to R6 are set so as to make the output voltage V of the operational amplifier 70 fall in a range between Vb and Va.

Figure 7:
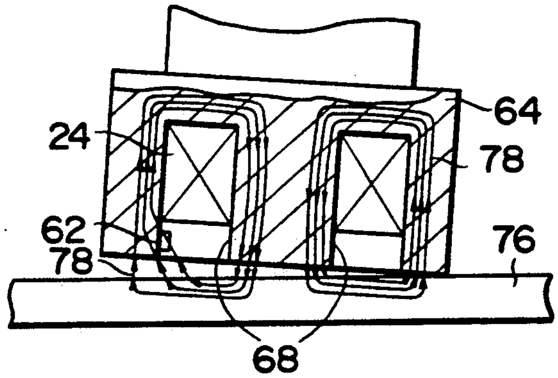
FIG. 7 shows the state of magnetic flux when a front part of the electromagnet base is lifted from the object.

If swarf is caught in the drill or annular cutter mounted on the drill apparatus 10 or if the drill or cutter becomes blunt, thrust load increases, thereby lifting that part of the electromagnet base 64, in which the arbor 66 is provided, from the object 76, as shown in FIG. 7. In FIG. 7, the lift of the electromagnet base 64 is illustrated exaggeratedly.

As a result of this lift, a gap is produced between the electromagnet base 64 and the object 76 and magnetic flux passes through the gap. As is well known, a magnetic circuit is constructed so as to reduce the magnetic resistance thereof to a minimum. Thus, part of the magnetic flux 78 generated by excitation of the electromagnet 24 passes through the Hall element 62, and the output voltage V of the operational amplifier 70 increases.

When the output voltage V exceeds potential Va, the output of the comparator 72 goes to "H" level and the transistor 58 is turned on. Consequently, the main relay drive hold circuit 52 is activated and the relay 30 is driven. Thus, the contact 28 is opened, and the rotation of the drill motor 20 and feed motor 26 is stopped.

Since the operation of the main relay drive hold circuit 52 is held, as stated above, the master stop state is maintained after the rotation of the drill motor 20 and feed motor 26 is stopped, even if the electromagnet base 64 is completely attached to the object 76 by magnetic force once again.

In this state, the main switch 16 is restored to the first stage operation mode and electric power supply to the feed motor control circuit 36 is stopped. Thereafter, swarf caught in the drill or annular cutter is removed or the drill or annular cutter is replaced. Then, the main switch 16 is operated in the second stage operation mode.

Even when the drill apparatus performs a normal drilling operation, if electric power supply to the electromagnet 24 is stopped owing to breakage of a line connected to the electromagnet 24 or bridge-type rectifier 18, the magnetic flux 78 passing through the Hall element 62 reduces to zero and the output voltage of the operational amplifier 70 lowers below Vb. In this case, the output of the comparator 74 becomes at "H" level and the transistor 58 is turned on. Accordingly, the relay 30 is operated and the rotation of the drill motor 20 and feed motor 26 is stopped.

Even when the electromagnet base 64 is completely attached to the object 76 by magnetic force, the Hall voltage Vh of the operational amplifier 70, i.e. the output voltage V of the amplifier 70 varies in accordance with the thickness of the object 76. In other words, when the base 64 is attached to a thick object (76), the magnetic flux 78 generated by the electromagnet 24 passes through the object 76 substantially completely. Thus, a very small amount of magnetic flux 78 passes through the Hall element 62, and the Hall voltage Vh is low.

Inversely, when the base 64 is attached to a thin object (76), the magnetic flux 78 is saturated or substantially saturated in the object 76. Consequently, the magnetic flux 78 leaks slightly from the object 76 and passes through the Hall element 62. Thus, in this case, the Hall voltage Vh is relatively high.

The resistance values of the various resistors may be determined in the following manner. That is, when the electromagnet base 64 is attached to the object 76 with a minimum thickness and to the object 76 with a maximum thickness, which thickness allows the attachment of the drill apparatus 10, the voltage V output from the operational amplifier 70 coincides with the voltage at the connection node Va and that at the connection node Vb. If the resistance values are determined in this manner, the transistor 58 can surely be turned on in either case where the electromagnet base 64 lifts or the power supply to the electromagnet 24 is stopped. Thus, the drill motor 20 and feed motor 26 are stopped.

Figure 8:
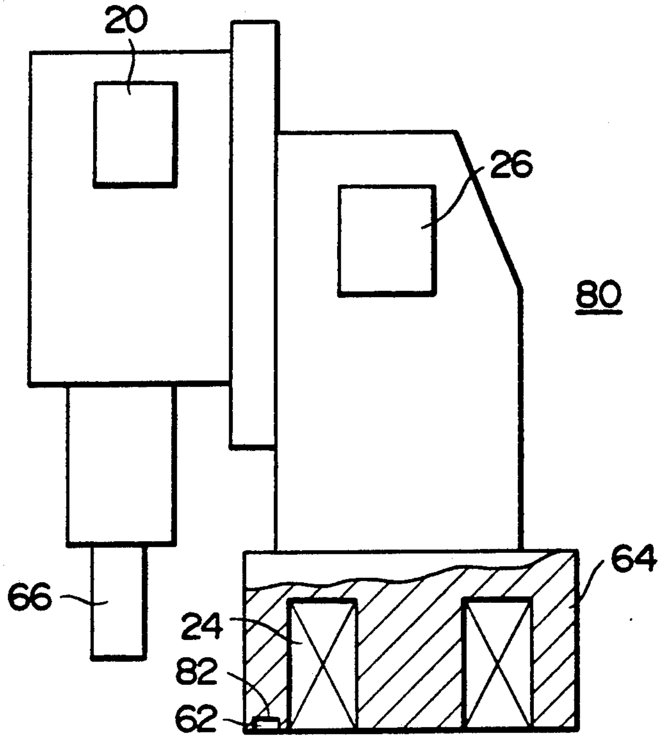
FIG. 8 is a side view of a drill apparatus according to a second embodiment of the invention.

FIG. 8 is a side view of a drill apparatus 80 with an electromagnet base according to a second embodiment of the invention. FIG. 8 is similar to FIG. 3. In FIG. 8, the same reference numerals as are used in FIG. 3 denote the same or equivalent parts.

That part of the bottom surface of the electromagnet base 64, which is near the arbor 66, is provided with a small hole 82. The Hall element 62 is situated in the hole 82.

Figure 9:
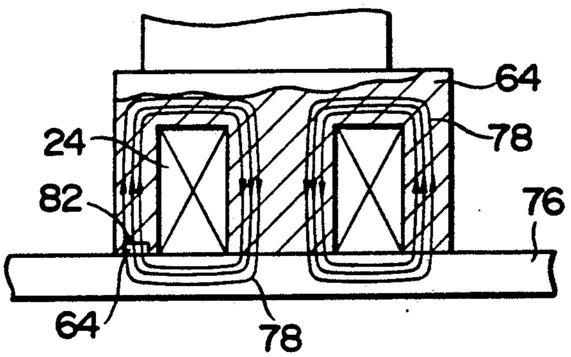
FIG. 9 shows the state of magnetic flux when the entire lower surface of the electromagnetic base is brought into magnetic contact with the object.

When the Hall element 62 is positioned in this manner and the electromagnet base 64 is completely attached to the object 76, as shown in FIG. 9, the magnetic flux 78 generated by supplying power to the electromagnet 24 passes through the bottom surface of the base 64. Consequently, a great amount of magnetic flux 78 passes through the Hall element 62.

Figure 10:
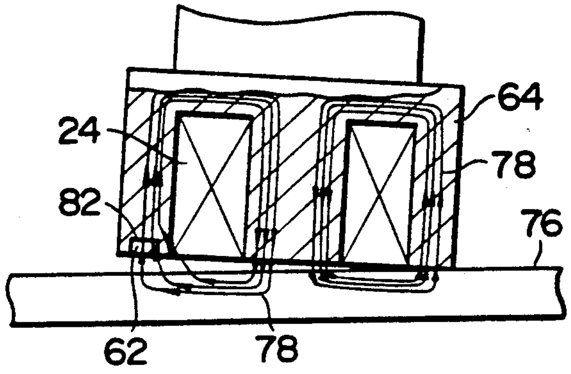
FIG. 10 shows the state of magnetic flux when a front part of the electromagnet base in the second embodiment is lifted from the object.

If the front part of the drill apparatus 80 (i.e. that portion of the electromagnet base 64, which is near the arbor 66) is lifted from the object 76 even slightly, as shown in FIG. 10, the amount of magnetic flux 78 passing through the bottom surface of the electromagnet base 64 decreases and the Hall voltage Vh lowers.

Though not shown, this type of drill apparatus 80 with electromagnet base has a stabilizer (of bolt type or wheel type) at its rear part. The stabilizer receives a reaction force of swarf, etc. In this apparatus, since the electromagnet base 64 is lifted with a contact point of the stabilizer and the surface of the object 76 as a fulcrum, it is desirable that the location of provision of Hall element 62 be at the front part of the base 64, as in the first embodiment.

Figure 11:
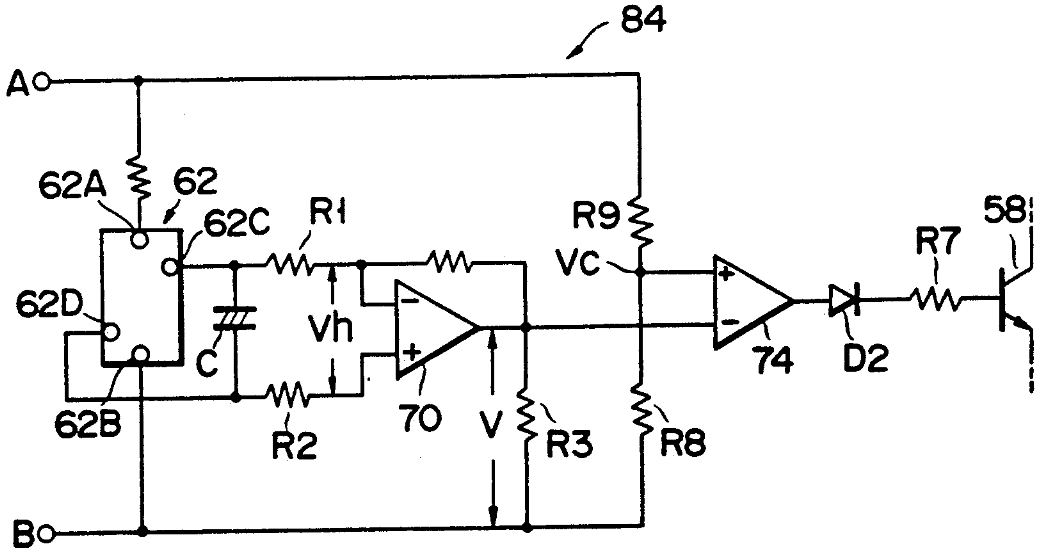
FIG. 11 is a block diagram showing a modification of the second safety circuit.

When the Hall element 62 is situated, as shown in FIG. 8, it would be advantageous to replace the second safety circuit 60, as shown in FIG. 2, with a second safety circuit 84, as shown in FIG. 11.

FIG. 11 is a block diagram showing the second safety circuit 84. In FIG. 11, the same reference numerals as are used in FIG. 2 denote the same or equivalent parts.

In the case where the Hall element 62 is situated on the bottom surface of the electromagnet base 64, the Hall voltage falls when the base 64 is lifted. Thus, the output voltage V of the operational amplifier 70 is compared with the voltage at connection node Vc which is divided by resistors R8 and R9, as is show in FIG. 11. The resistance values of these resistors R8 and R9 may be set so that the output voltage V falls below Vc when the electromagnet base 64 lifts.

When the thickness of the object 76 varies, the leakage magnetic flux is greater as the object 76 becomes thinner. Thus, the Hall voltage is lower. When the electromagnet base 64 is attached by magnetic force to the object 76 having a minimum thickness which allows the attachment of the drill apparatus, the resistance values of the resistors may be set so that the voltage V output from the operational amplifier 70 may substantially coincide with the voltage at connection node Vc. Consequently, the transistor 58 can surely be turned on in either case where the electromagnet base 64 is lifted or the power supply to the electromagnet 24 is stopped. Thus, the drill motor 20 and feed motor 26 can be stopped.

As is shown in FIG. 3, in the case where the Hall element 62 is situated in the recess 68 in which the electromagnet 24 is contained, it is not necessary to provide the electromagnet base 64 with small hole 82 (in FIG. 8) for storing Hall element 62. Thus, the fixing of the Hall element 62 is easy.

In the second embodiment shown in FIG. 8, however, only one comparator (comparator 74 in FIG. 11) may be used in the second safety circuit. Thus, the structure of the second safety circuit can be simplified.

As has been described above, the present invention has the following advantages.

When the electromagnet base 64 is slightly lifted from the object 76, the magnetic flux 78 passing through the Hall element 62 varies. The variation of the Hall voltage generated at this time is detected, thereby immediately and surely stopping the power supply to only the drill motor 20 or to both drill motor 20 and feed motor 26.

In addition, since the Hall element 62 does not use a mechanical contact such as a microswitch, a slight lift of the electromagnet base 64 can be detected for a long time, and the detection of lift of electromagnet base 64, the stop of power supply to the drill motor 20, and the stop of power supply to the feed motor 26 can surely be performed for a long time.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A drill apparatus having a drill element and an electromagnet base having an electromagnet for attaching the apparatus to a workpiece by magnetic force, said apparatus comprising:

- a drill motor for rotating said electric drill;
- a Hall element mounted on the electromagnet base such that, in use, a Hall voltage output varies in the event the electromagnetic base is lifted form the workpiece;
- comparing means for comparing the Hall voltage output from said Hall element with a predetermined reference voltage; and
- a safety circuit for stopping power supply to the drill motor in accordance with an output from the comparing means.

2. The apparatus according to claim 1, further comprising a feed motor for vertically moving the electric drill, wherein said safety circuit stops power supply to the drill motor and the feed motor in accordance with the output from the comparing means.

3. The apparatus according to claim 2, wherein said Hall element is situated on the electromagnet base at such a position that magnetic flux generated by the electromagnet passes through the Hall element, when the electromagnet base is attached to the workpiece by magnetic force.

4. The apparatus according to claim 3, wherein said Hall element is situated on that part of the electromagnet base, which is near the electric drill.

5. The apparatus according to claim 2, wherein said Hall element is situated on the electromagnet base at such a position that magnetic flux generated by the electromagnet does not pass through the Hall element, when the electromagnet base is attached to the workpiece by magnetic force.

6. The apparatus according to claim 5, wherein said Hall element is situated on that part of the electromagnet base, which is near the electric drill.

7. The apparatus according to claim 2, wherein said comparing means comprises a first comparator for comparing the Hall voltage output from the Hall element with a first predetermined voltage and generating a predetermined output when the Hall voltage exceeds the first predetermined voltage, and a second comparator for comparing the Hall voltage output from the Hall element with a second predetermined voltage and generating a predetermined output when the Hall voltage exceeds the second predetermined voltage, and wherein said safety circuit stops power supply to the drill motor and the feed motor when either the first comparator or the second comparator has generated said predetermined output.

8. The apparatus according to claim 2, wherein said comparing means comprises a comparator for comparing a Hall voltage output from the Hall element with a predetermined voltage and generating a predetermined output when said Hall voltage falls below the predetermined voltage, and wherein said safety circuit stops power supply to the drill motor and the feed motor when said comparator has generated said predetermined output.

9. The apparatus according to claim 1, wherein said Hall element is situated on the electromagnet base at such a position that magnetic flux generated by the electromagnet passes through the Hall element, when the electromagnet base is attached to the workpiece by magnetic force.

10. The apparatus according to claim 9, wherein said Hall element is situated on that part of the electromagnet base, which is near the electric drill.

11. The apparatus according to claim 1, wherein said Hall element is situated on the electromagnet base at such a position that magnetic flux generated by the electromagnet does not pass through the Hall element, when the electromagnet base is attached to the workpiece by magnetic force.

12. The apparatus according to claim 11, wherein said Hall element is situated on that part of the electromagnet base, which is near the electric drill.

13. The apparatus according to claim 1, wherein said comparing means comprises a first comparator for comparing the Hall voltage output from the Hall element with a first predetermined voltage and generating a predetermined output when the Hall voltage exceeds the first predetermined voltage, and a second comparator for comparing the Hall voltage output from the Hall element with a second predetermined voltage and generating a predetermined output when the Hall voltage exceeds the second predetermined voltage, and wherein said safety circuit stops power supply to the drill motor when either the first comparator or the second comparator has generated said predetermined output.

14. The apparatus according to claim 1, wherein said comparing means comprises a comparator for comparing the Hall voltage output from the Hall element with a predetermined voltage and generating a predetermined output when said Hall voltage falls below the predetermined voltage, and wherein said safety circuit stops power supply to the drill motor when said comparator has generated said predetermined output.

* * * * *